United States Patent [19]

Nighan et al.

[11] 4,016,448
[45] Apr. 5, 1977

[54] HIGH POWER ELECTRIC DISCHARGE METHOD AND APPARATUS FOR LASER CHEMICAL SYNTHESIS AND OTHER APPLICATIONS

[75] Inventors: William L. Nighan, Manchester; Walter J. Wiegand, Glastonbury, both of Conn.

[73] Assignee: United Technologies Corporation, Hartford, Conn.

[22] Filed: Nov. 26, 1975

[21] Appl. No.: 635,318

[52] U.S. Cl. .............................. 313/231; 313/309; 315/111.2; 331/94.5 G; 31/94.5 PE
[51] Int. Cl.² ...................... H01J 61/28; H01S 3/00
[58] Field of Search ............... 313/231, 231.3, 309, 313/315; 315/111.2, 111.7; 331/94.5 G, 94.5 PE, 94.5 D

[56] References Cited

UNITED STATES PATENTS

| 3,720,885 | 3/1973 | Koloc | 331/94.5 |
| 3,758,874 | 9/1973 | Hoag | 331/94.5 |

Primary Examiner—Rudolph V. Rolinec
Assistant Examiner—Vincent J. Sunderdick
Attorney, Agent, or Firm—Prutzman, Hayes, Kalb & Chilton

[57] ABSTRACT

Electric discharge method and apparatus for producing a relatively large volume, diffuse glow gas discharge plasma for laser, chemical synthesis and other applications at high power, high pressure and high volume levels and such that plasma properties are dominated by collision processes and wherein the operational parameters of the electric discharge are established to provide an average gas residence time $T_R$ in a continuous wave convective electric discharge and a discharge duration time $T_P$ in a pulsed electric discharge that is approximately equal to the plasma instability growth time $T_G = CP/JE$ where P is the pressure in Torr, JE is the electric power density in Watts/cm³ and C is a constant typically about $10^{-4}$ for self-sustained gas electric discharges and $10^{-3}$ for externally sustained gas electric discharges and wherein the convective electric discharge apparatus have a flow baffle system with a transverse foamed plastic baffle and a transverse turbulence generator plate for establishing an approximately isotopic and uniform turbulent flow pattern in the electric discharge region and such that $T_R$ and $T_G$ are representative of local values.

18 Claims, 4 Drawing Figures

HIGH POWER ELECTRIC DISCHARGE METHOD AND APPARATUS FOR LASER CHEMICAL SYNTHESIS AND OTHER APPLICATIONS

The invention herin described was made in the course of or under contract or subcontract thereunder with the Department of the Navy.

BRIEF SUMMARY OF THE INVENTION

The present invention relates generally to electric discharge method and apparatus for laser, chemical synthesis and other applications and more particularly to new and improved electric discharge method and apparatus for producing a diffuse glow electric discharge plasma at relatively high power, high pressure and high volume levels and having notable utility in producing for example a relatively high power optical laser medium for laser applications or a high plasma mass flow rate for chemical synthesis or other non-laser applications.

It is a principal aim of the present invention to provide new and improved electric discharge method and apparatus for producing a diffuse glow gas electric discharge plasma at high power levels.

It is another aim of the present invention to provide new and improved convective electric discharge method and apparatus for producing a relatively large volume (e.g. $> 10^4 cm^3$) and relatively high power (e.g. $> 10$ Watts/$cm^3$) self-sustaining diffuse glow electric discharge plasma.

It is another aim of the present invention to provide a new and improved convective electric discharge method for scaling a high pressure (e.g. $> 100$ Torr), large volume and high power cw or pulsed diffuse glow electric discharge plasma at the optimum pressure, volume and power levels.

It is another aim of the present invention to provide new and improved high power convective electric discharge method and apparatus which do not require an auxiliary ionization source or technique for preventing plasma constriction or glow collapse.

It is a further aim of the present invention to provide new and improved convective electric discharge method and apparatus for producing a large volume cw self-sustaining molecular glow discharge at relatively high steady state power levels.

It is another aim of the present invention to provide a new and improved high power convective electric discharge device having an economical construction.

It is another aim of the present invention to provide new and improved convective electric discharge method and apparatus having notable use in relatively constant pressure subsonic laser systems.

It is a further aim of the present invention to provide a new and improved gas flow regulator or baffle system for a convective electric discharge device for establishing an approximately isotropic and uniform turbulent gas flow in the electric discharge region. In accordance with the present invention, a new and improved flow baffle and a new and improved combination flow baffle and electrode are provided for convective electric discharge apparatus for establishing an approximately isotropic and uniform turbulent gas flow pattern in the electric discharge region.

It is another aim of the present invention to provide new and improved method and apparatus for generating a steady state, self-sustaining electric discharge plasma at relatively high pressure levels (e.g. $> 100$ Torr).

It is another aim of the present invention to provide new and improved electric discharge method and apparatus for generating steady state, self-sustaining, large volume laser discharges at electric power density levels greater than 10 W/$cm^3$.

It is another aim of the present invention to provide a new and improved cathode unit for a longitudinally excited convective electric discharge device.

It is a further aim of the present invention to provide a new and improved method for generating a steady state large volume cw laser plasma at an electrical power density greater than 10 W/$cm^3$.

It is another aim of the present invention to provide new and improved electric discharge method and apparatus for generating a high power electric discharge laser in either the cw or pulse mode and wherein the electric discharge is either self-sustained or sustained by an external source of ionization.

Other objects will be in part obvious and in part pointed out more in detail hereinafter.

A better understanding of the invention will be obtained from the following detailed description and the accompanying drawings of illustrative applications of the invention.

DESCRIPTION OF THE PREFFERED EMBODIMENTS

Detailed analysis of the plasma stability characteristics of high power continuous wave (cw) convective electric discharge apparatus has shown that the criteria for the thermal mode of plasma instability leading to glow collapse for large volume plasmas where the plasma properties are dominated by collision processes are generally exceeded for the values of pressure and electrical power density of practical significance. However, it has been found that the time required for the growth of these instabilities in a large volume continuous wave (cw) self-sustained diffused glow electric discharge is on the order of one millisecond over a relatively wide range of corresponding pressures and electrical power densities, a time comparable to the average gas residence time in the discharge region in convection lasers. Thus, it is believed that a principal and fundamental role of the gas flow, in addition to heat removal, in convective electric discharge devices, is convection of the unstable plasma through the discharge region in a time less than that required for plasma collapse to occur. Precisely the same reasoning can be applied to pulsed electric discharge devices by recognition of the fundamental similarity between gas residence time and discharge duration or pulse time.

In order to utilize these concepts in a practical way, it is necessary to relate instability growth time to specific system parameters. Detailed analysis has shown that, to a reasonable approximation, the instability growth time $T_G$ is related to gas pressure $P$ in Torr and electrical power density JE in Watts/cm$^3$ by the expression $T_G = CP/JE$ where $C$ is a constant. For self-sustained electric discharges $C \approx 10^{-4}$, whereas where external ionization means is employed for sustaining the electric discharge $C \approx 10^{-3}$. For example, using the foregoing formula for a self-sustained $CO_2$ laser at a pressure of 100 Torr and an electrical power density level of 10 W/cm$^3$, it is found that $T_G \approx 10^{-3}$ seconds. On the basis of these considerations the minimum criterion for production of a stable, diffuse glow discharge, is that the average gas residence time $T_R = L/V$, be less than the average instability growth time, $T_G$, where $L$ is the length of the electric discharge region in the flow direction and $V$ is the average gas velocity in the electric discharge region.

The foregoing analysis is amplified in our published articles thereon published in *Applied Physics Letters* on Dec. 1, 1974 under the title "Causes of Arcing In cw $CO_2$ Convection Laser Discharges " and on May 15, 1975 under the title "Influence of Fluid-Dynamic Phenomena on the Occurrence of Constriction in cw Convection Laser Discharges."

Figure 1:
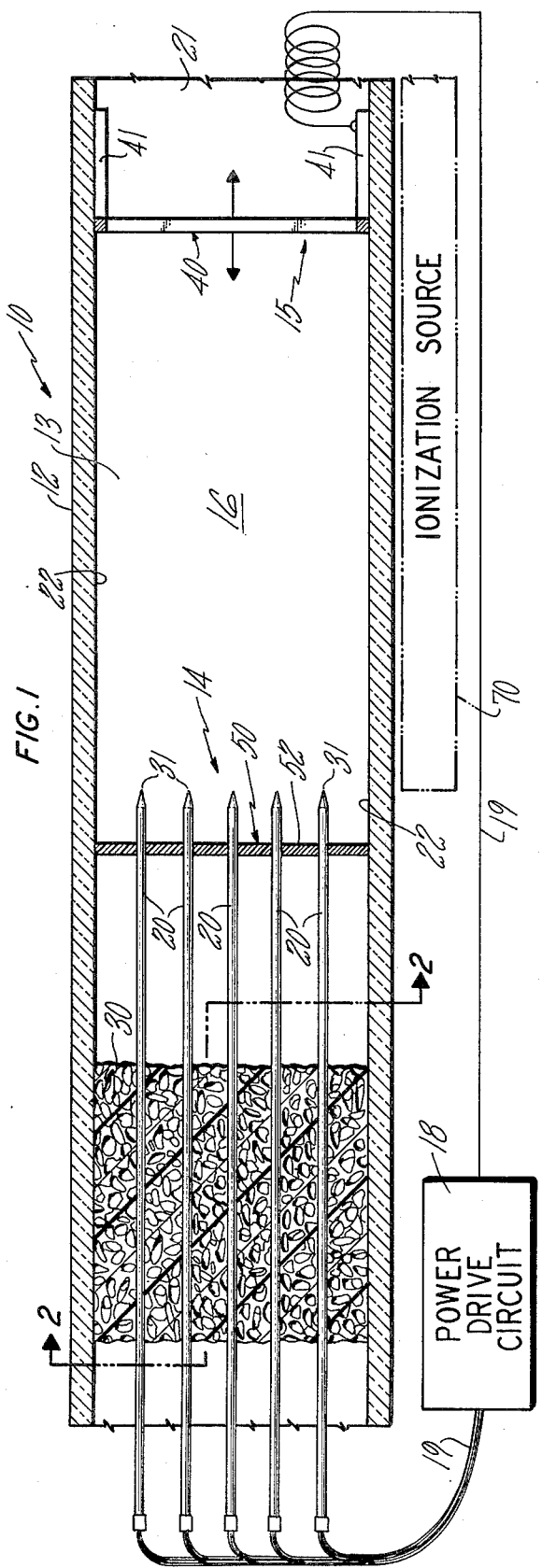
FIG. 1 is a longitudinal section view, partly broken away and partly in section, of an embodiment of a longitudinally excited convective electric discharge device incorporating the present invention.
Figure 2:
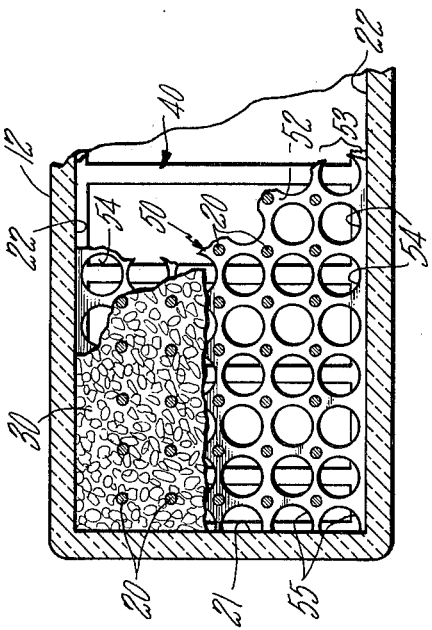
FIG. 2 is a transverse section view, partly broken away and partly in section, of the convective electric discharge device of FIG. 1 taken substantially along line 2—2 of FIG. 1 and showing an embodiment of a turbulence generator baffle thereof.

Referring now to the drawings in detail wherein like numerals are used to represent like parts, and in particular to FIGS. 1 and 2, an embodiment 10 of a convective electric discharge device incorporating the present invention comprises an elongated rectangular channel 12 of Pyrex having a straight internal elongated passageway 13 with a transverse rectangular 5 cm by 15 cm opening and a transverse sectional area of approximately 75 cm$^2$. The convective electric discharge device 10 is employed in a subsonic recirculating gas flow laser system using for example a laser gas mixture of 5% $CO_2$, 35% $N_2$ and 60% He, and a constant average flow velocity of 100 meters per second, from left to right through the channel 12 as viewed in FIG. 1.

A cathode unit 14 and an anode unit 15 are mounted in longitudinally spaced relationship within the channel passageway 13 to provide an intermediate electric discharge region 16. A suitable high voltage power drive circuit 18 is connected to the electrodes of the cathode and anode by individual electrical leads 19 to the cathode pins 20 and the anode 40 and is suitably operable for scaling the electrical power to produce a plasma at the desired power level in the electrical discharge region, either in a steady state operation or a pulsed operation as desired.

The cathode unit 14 has a high density array of parallel elongated cathode pins 20 (seventy-five in the exemplary embodiment shown) mounted within the gas flow passageway 13 parallel to the internal sidewalls 21, 22 of the channel 12 and to provide five parallel rows of cathode pins 20, each having fifteen cathode pins, the row and individual pin spacing being approximately 8.3 mm. For example, the cathode pins 20 are made of tantalum and have a diameter of 1/16 inch (1.6 mm) and a length of 10–15 cm.

A transverse gas permeable or porous cellular baffle 30 permitting both trasverse and longitudinal gas flow therethrough is mounted to extend between and engage the internal sidewalls 21, 22 of the channel 12 as shown in FIG. 2. The cellular baffle 30 is substantially uniform across the gas passageway 13 and is mounted intermediate the longitudinal ends of the cathode pins 20 rearwardly of the common transverse plane of the forward tips 31 thereof and provides for supporting, at least in part, the cathode pins 20 in the parallel spaced relationship described. In the exemplary embodiment shown, the cellular baffle 30 has a constant thickness of 5 cm with parallel transverse upstream and downstream faces and its downstream face is spaced for example 5–10 cm rearwardly or upstream of the common transverse plane of the forward tips 31 of the cathode pins 20.

The cellular baffle 30 is formed with an average cell size of a few millimeters (e.g. 2–5 mm), and for example the cellular baffle 30 is constructed of a foamed polyurethane plastic and either foamed in situ or prefoamed and precut to size, then preassembled with the cathode pins 20 by inserting them through the cellular baffle 30 before being inserted into the channel passageway 13. Such a cellular baffle 30 has been found to establish a substantially uniform gas flow velocity immediately downstream thereof without fluid non-uniformities and large scale eddies, and which was measured (in the absence of a dc electric discharge) to have a gas flow velocity profile uniform to approximately 1% and a boundary layer thickness of only a few mm. Accordingly, the upstream flow turbulence, caused in part by the rear or upstream ends of the cathode pins 20 and the upstream electrical leads 19 and electrical connections to the cathode pins is substantially completely eliminated by the porous baffle 30. Also, as the transverse cellular baffle 30 serves as a partial or complete support for the cathode pins 20, the need for additional upstream cathode support structure causing flow turbulence is eliminated or reduced.

The downstream anode unit 15 has a multiple bar electrode 40 with downstream support legs 41 and is longitudinally adjustable within the channel 12 to establish the length of the electric discharge region 16 for a purpose hereinafter described.

A transverse turbulence generator baffle 50 is mounted to extend between and in engagement with the internal sidewalls 21, 22 of the channel 12 and is located slightly upstream of the common transverse plane of the cathode tips 31 to convert the relatively uniform and non-turbulent gas flow pattern provided by the cellular baffle 30 to an approximately isotropic and uniform turbulent flow pattern in the vicinity of the cathode tips 31 and in the entire electric discharge region 16. It has been found that if the turbulence generator 50 is mounted between approximately 1–3 cm upstream of the common transverse plane of the cathode tips 31, there is a dramatic improvement in the uniformity of the plasma produced in the electric discharge region 16 and a concomitant improvement in the diffused glow characteristic and volume of the electric discharge. Such is explained by the enhanced fluid mixing at the cathode tips and the approximately isotropic and uniform turbulence produced throughout the electric discharge region 16. Also, the average electric discharge power density that can be achieved before glow collapse is substantially increased (by as much as a factor of 10). That advantageous result is explained on the basis that local regions of significantly higher than average power density and local regions of significantly longer than average gas residency time are minimized by the described turbulent flow pattern and such that maximum local values of electrical power density and gas residency time are typical of the average power density and gas residency time and the average criterion $T_R=T_G$ has local meaning as well.

It has also been found that if the turbulence generator 50 is mounted downstream (e.g. 1 cm) or further upstream (e.g. 5 cm) of the common transverse plane of the cathode tips 31, the power density instability threshold is not substantially improved by the presence of the turbulence generator 50.

Referring to FIG. 2, the turbulence generator 50 is provided by a 1.5 mm thick perforated or apertured non-conductor plate 52 having six parallel rows 53 of gas passages or apertures 54, 55 with the rows extending parallel to and between the five parallel rows of cathode pins 20. Each aperture row has sixteen apertures (i.e., one more than the number of cathode pins in a cathode pin row), with a center spacing of approximately 8.3 mm equal to the lateral spacing of the pins 20 and the end apertures 55 of each row are approximately half-round and the remaining apertures 54 are circular. The apertures 54, 55 are evenly spaced and have a 7.1 mm diameter, and each cathode pin 20 extends through an approximately 1/16 inch (1.6 mm) opening in the plate 52 centrally between each group of four apertures. The minimum transverse web thickness or distance between apertures is established on the basis of well known aerodynamic principles to have a Reynolds number in the range corresponding to a turbulent wake and whereby a highly turbulent wake is produced by the baffle 50 at the cathode tips 31 and downstream of the cathode tips. The turbulence pattern so produced is of a high intensity and is approximately isotropic and uniform in the discharge region, in marked contrast to other means which have been used to condition the flow in convective electric discharge apparatus. The plate 50 has a frontal area (flow blockage) of approximately 40%. The turbulence generator plate 50 may also be employed to assist in supporting the cathode pins 20.

Figure 3:
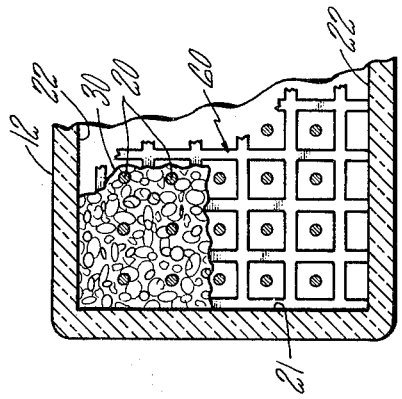
FIG. 3 is a transverse section view, partly broken away and partly in section, of a modified embodiment of the convective electric discharge device of FIG. 1 employing another embodiment of a turbulance generator baffle.

Another embodiment 60 of a turbulence generator baffle, preferably having approximately the same frontal area (i.e. approximately 40%), is shown in FIG. 3. The baffle 60 is provided by an 8.3 mm mesh rectangular woven wire grid or grid plate extending between the internal sidewalls 21, 22 of the channel 12 and with each cathode pin 20 positioned centrally within each grid opening. Also, it has been found that an effective turbulence generator baffle is provided by a combination of the perforated plates 50, 60 with the plates longitudinally spaced slightly and with the forward of the two plates spaced slightly upstream (i.e. 1-3 cm) of the common transverse plane of the cathode tips 31.

For typical values of pressure and flow velocity, the Reynolds number for convectively cooled laser mixtures will usually exceed the laminar-turbulent transition value by a large margin. It is well known that smooth development of the turbulent flow field from the channel inlet may require a length in the flow direction of the order of 100 minimum transverse channel dimensions. However, such a channel length is usually impractical. Also, in most convective laser applications where longitudinal excitation is utilized as in the electric discharge device 10 of FIG. 1, the flow is at least partially obstructed by electrodes which are located directly in the flow stream. In the presence of such obstructions, the transition to turbulent flow begins abruptly and often evolves in a highly irregular manner. Experimental studies have shown that the resulting non-uniformities in both the flow velocity and turbulence persist throughout the electric discharge region and thereby significantly affect the threshold conditions for electric discharge instability by reducing the local instability growth time. Such non-uniformities provide the sites for local current density concentrations which lead to plasma instability. Local current density concentrations at or near the electrodes have a similar effect. While numerous electrode designs and flow conditioning devices have been used in the past, prior to the present invention the requirement to produce a uniform, isotropic turbulent flow pattern in conjunction with a uniform velocity profile so that the local values of gas residence time did not exceed $T_G$ had not been recognized. Further, plasma instability which leads to glow collapse (e.g. plasma constriction, glow-to-arc transition; streamering) in dc electric discharges presents a significant obstacle to the scaling of lasers to high optical power levels (e.g. > 10 KW in cw electric discharges or 100 KW in pulsed electric discharges). As discussed in U.S. Pat. No. 3,863,103 of Alan C. Eckbreth, dated Jan. 28, 1975 and entitled "Apparatus and Method for Enhancing Power Disposition in Convective Electric Discharges" such plasma instability is sensitive to variations in temperature and density of the gas within the electrical discharge region.

The power density threshold for the onset of plasma instability is increased significantly by the cathode unit 14 described. Such increase is obtained by the combination of the elongated cathode structure (which, not having a significant transverse structural dimension, introduces minimal obstruction in the flow), the transverse cellular baffle 30 which provides for establishing a uniform and non-turbulent flow pattern intermediate the ends of the elongated cathode, and the properly located turbulence generator plate 50 and/or 60 which converts the uniform non-turbulent flow pattern into a turbulent and approximately isotropic and uniform flow pattern in the region of the electrode pin tips and in the electric discharge region generally.

The anode 15 is positioned downstream of the common plane of the cathode pin tips 31 so that the average gas residence time $T_R$ in the electric discharge region 16 is established to be approximately equal to or less than the plasma instability growth time $T_G$ for a self-sustaining cw electric discharge (i.e. $T_R \lesssim T_G$) as an approximate scaling and design criterion for constant pressure subsonic recirculating gas-flow systems (where $T_R$ = discharge length ÷ gas velocity; and $T_G$ is approximately CP/JE where P is the pressure in Torr, JE is the electrical power density in Watts/cm$^3$ and the constant C, though being dependent on the specific conditions, is typically about $10^{-4}$ for where there is no external ionization source, and is typically about $10^{-3}$ where an external ionization source 70 is employed (as shown in broken lines in FIG. 1) for ionization of the gas in the electric discharge region. For example, using the foregoing formula $T_G \approx CP/JE$, $T_G$ is approximately 1 millisecond where C is $10^{-4}$, P is 100 Torr, and JE is 10 Watts/cm$^3$.

With the laser structure described and by establishing the gas residence time $T_R \gtrsim T_G$ as described, it has been found that a self-sustaining cw laser plasma can be produced at an electrical power density in excess of 10 Watts/cm$^3$ and at pressure levels at 150 Torr and above. Also, it is believed that even larger volume plasmas for laser applications could be established by direct scaling of the electric discharge in the transverse plane.

Similarly, a pulsed mode high volume and high power diffused glow electric discharge plasma can be produced in a convective electric discharge device as shown in FIG. 1 (or in a non-convective electric discharge device, not shown) by scaling the average pulse time $T_P$ to equal the plasma instability growth time $T_G$ where $\approx CP/JE$ as previously described. Thus, for example, using the foregoing formula, a power density of 10 KW/cm$^3$ could be established without external ionization (i.e. $C \approx 10^{-4}$), and a power density of 100 KW/cm$^3$ could be established with external ionization (i.e. $C \approx 10^{-3}$) by scaling the pressure $P$ at 100 Torr and the average pulse time $T_P$ at 1 microsecond.

Thus, with high volume, continuous wave, diffused glow electric discharge apparatus, a relatively high gas flow velocity in the discharge region is fundamental to the maintenance of a stable plasma at a relatively high pressure and power density. With $T_G$ on the order of a millisecond for many conditions of interest, and with a typical average gas velocity of 100 meters per second, the discharge length in the flow direction must be approximately 10 centimeters. The anode unit 15 is longitudinally adjustable within the elongated channel 12 without altering upstream dynamic conditions in the electric discharge region 16, and the anode unit 15 is longitudinally set initially in accordance with the close approximation provided by the foregong analysis and then more accurately set for accurately scaling the desired parameters of each application for maintaining plasma stability. With pulse mode high volume, diffused glow electric discharge apparatus, the average pulse time $T_P$ may be less than 1 microsecond and may be even as short as 1 nanosecond. Likewise, the pressure in Torr and power density JE in Watts/cm$^3$ are scaled with $T_P$ to produce the optimum pressure, power density and pulse time parameters for each application.

Figure 4:
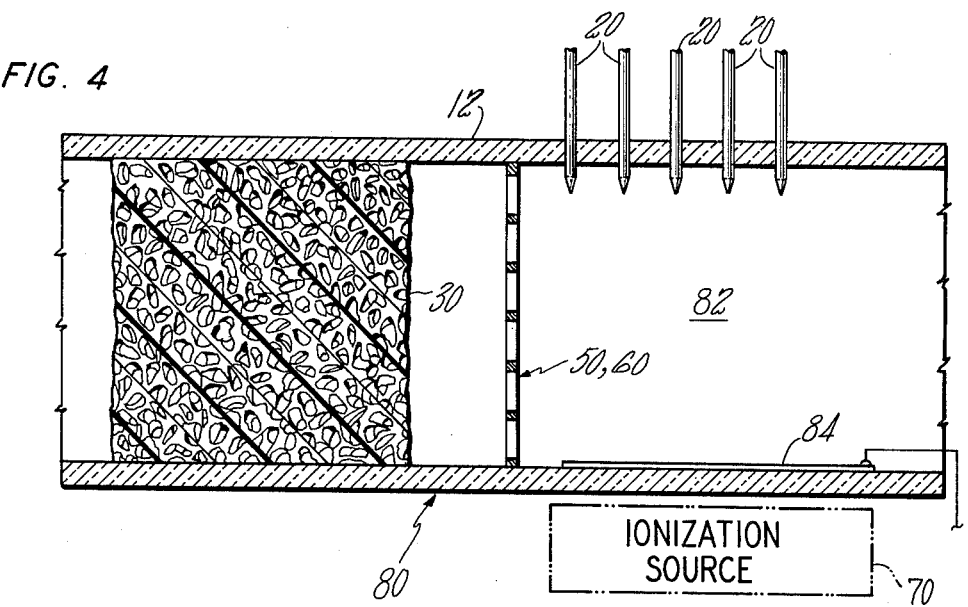
FIG. 4 is a longitudinal section view, partly broken away and partly in section, of an embodiment of a transversely excited convective electric discharge device incorporating the present invention.

Also referring to FIG. 4, a transversely excited convective electric discharge device 80 may be employed with or without an external ionization source 70 in accordance with the operational parameters described. And, as with the longitudinally excited electric discharge device of FIG. 1, an upstream gas permeable or porous cellular baffle 30 and a downstream turbulence generator plate 50 (without openings for the cathode pins 20) and/or turbulence generator plate 60 are employed for producing an approximately isotropic and uniform turbulent gas flow pattern in the electric discharge region 82 between the tips of the cathode pins 20 and a suitable longitudinally extending anode 84.

To date, results obtained in both longitudinally and transversely excited electric discharge experiments utilizing the present invention have shown that the power density threshold for the onset of instability can be increased significantly. Additionally, it has been found that with the present invention, a self-sustaining, cw diffuse glow electric discharge plasma can be produced at power density levels comparable with those achievable in electric discharge devices having an external or supplementary source of ionization. And, uniform high volume and high power diffuse glow discharges in either the cw mode or pulsed mode can be produced at pressures over 100 Torr.

As will be apparent to persons skilled in the art, various modifications, adaptations and variations of the foregoing specific disclosure can be made without departing from the teachings of the present invention.

We claim:

1. In a convective electric discharge device having a gas convection channel with a gas passageway for the flow of gas in one direction therethrough and plasma generating means for extablishing a gas plasma in an electric discharge region of the gas passsageway, the improvement wherein the plasma generating means comprises a gas pervious cellular baffle extending transversely across substantially the entire gas passageway upstream of the electric discharge region for producing, immediately downstream thereof, a substantially uniform gas velocity profile, and turbulence generator means downstream of the cellular baffle and upstream of the electric discharge region and operable to convert said substantially uniform gas velocity profile to an approximately isotropic and uniform turbulent gas flow in the electric discharge region.

2. A convective electric discharge device according to claim 1 wherein the plasma generating means further comprises spaced upstream and downstream electrodes in the gas passageway establishing said electric discharge region therebetween, the upstream electrode comprising a plurality of elongated electrode elements extending along the gas passageway and through the gas pervious cellular baffle and turbulence generator means.

3. A convective electric discharge device according to claim 1 wherein the turbulence generator means is upstream of the electric discharge region from 1 to 3 cm.

4. A convective electric discharge device according to claim 1 wherein the turbulence generator means is an apertured turbulence generator plate extending transversely within the gas passageway.

5. A convective electric discharge device according to claim 4 wherein the plasma generating means further comprises spaced upstream and downstream electrodes in the gas passageway establishing said electric discharge region therebetween, wherein the upstream electrode comprises a plurality of generally evenly spaced elongated parallel electrode pins extending through the cellular baffle and turbulence generator plate and having electrode tips in a common transverse plane slightly downstream thereof.

6. A convective electric discharge device according to claim 4 wherein the transverse turbulence generator plate has a gas flow blockage area of about 40%.

7. In a convective electric discharge device having a gas convection channel with a gas passageway for the flow of gas in one direction therethrough and plasma generating means for establishing a diffuse glow plasma in an electric discharge region of the passageway, the improvement wherein the plasma generating means comprises baffle means with a first baffle extending transversely across substantially the entire gas passageway upstream of the electric discharge region for producing, immediately downstream thereof, a substantially uniform gas velocity profile, and a second turbulence generator baffle extending transversely within the gas passageway downstream of the first baffle and immediately upstream of the electric discharge region for converting said substantially uniform gas velocity profile to an approximately isotropic and uniform turbulent flow pattern in the electric discharge region to maintain a diffuse glow plasma therein.

8. A convective electric discharge device according to claim 7 wherein the plasma generating means comprises spaced upstream and downstream electrodes in the gas passageway establishing said electric discharge region therebetween, the upstream electrode comprising a plurality of elongated parallel cathode pins extending along the gas passageway and through the first and second transverse baffles.

9. A method of producing, without external ionization, a large volume diffuse glow plasma with an electric power density level $JE$ of at least 10 Watts/cm$^3$ in a gas flowing through an elongated gas convection channel, comprising the steps of providing in the gas convection channel a spaced cathode and an anode together establishing an electric discharge region therebetween having a length in the direction of flow providing an average gas residency time $T_R$ therein wherein $T_R \approx C\,(P/JE)$ where $C$ is approximately $10^{-4}$ and $P$ is the gas pressure in Torr, controlling the gas flow to provide an approximately isotropic and uniform turbulent gas flow in the electric discharge region, and applying electrical power to the cathode and anode to scale the power density in the electric discharge region to the level $JE$.

10. A method of producing a large volume diffuse glow plasma in accordance with claim 9 wherein the step of controlling the gas flow comprises a first flow control step of providing a substantially uniform non-turbulent gas flow in the gas convection channel upstream of the electric discharge region and a second flow control step of converting said uniform non-turbulent gas flow to said approximately isotropic and uniform turbulent gas flow downstream of the first control step and immediately upstream of the electric discharge region.

11. A method of producing a large volume diffuse glow plasma in accordance with claim 9 wherein the cathode and anode are longitudinally spaced within the gas convection channel with the cathode and anode respectively upstream and downstream of the electric discharge region and the cathode comprises a plurality of elongated parallel cathode pins extending in the direction of flow of the gas in the gas convection channel and having their cathode tips in generally a common transverse plane, and wherein the step of controlling the gas flow comprises a first flow control step of providing a substantially uniform non-turbulent gas flow in the gas convection channel intermediate the ends of the cathode pins and a second flow control step of converting said uniform non-turbulent gas flow to said approximately isotropic and uniform turbulent gas flow downstream of the first control step and within a range of 1 cm downstream to 3 cm upstream of said generally common transverse plane of the cathode tips.

12. A method of producing a large volume diffuse glow plasma such that the plasma properties are dominated by collision processes, with an electrical power density level $JE$ of at least 10 Watts/cm$^3$ in a gas flowing through a gas convection channel, comprising the steps of providing in the gas convection channel an upstream cathode with a plurality of elongated parallel cathode pins extending in the direction of flow of the gas in the gas convection channel and a downstream anode establishing with the cathode an electric discharge region therebetween having a length providing an average gas residency time not substantially greater than 1 millisecond, controlling the gas flow to provide an approximately isotropic and uniform turbulent gas flow in the electric discharge region by initially providing a substantially uniform non-turbulent gas flow within the gas convection channel intermediate the ends of the cathode pins and then converting the uniform non-turbulent gas flow to said approximately isotropic and uniform gas flow in the electric discharge region, and applying electrical power to the cathode and anode to scale the electrical power density in the electric discharge region to the level $JE$.

13. A method of producing, without external ionization, a large volume, self-sustaining, continuous wave diffuse glow electric discharge plasma, and such that plasma properties are dominated by collision processes, at a pressure level $P$ of at least 100 Torr and an electrical power density level $JE$ of at least 10 Watts/cm$^3$ in a gas flowing through a gas convection channel, comprising the steps of providing in the gas convection channel a spaced cathode and anode establishing an electric discharge region therebetween having a length in the direction of flow providing an average gas residency time $T_R$ therein wherein $T_R \approx C\,(P/JE)$ where $C$ is approximately $10^{-4}$, and applying electrical power to the cathode and anode to scale the electrical power density in the electric discharge region to the level $JE$.

14. A method of producing, with external ionization, a large volume, self-sustained, continuous wave, diffuse glow electric discharge plasma, and such that plasma properties are dominated by collision processes, at a pressure level $P$ of at least 100 Torr and an electrical power density level $JE$ of at least 10 Watts/cm$^3$ in a gas flowing through a gas convection channel comprising the steps of providing in the gas convection channel a spaced cathode and anode establishing an electric discharge region therebetween having a length in the direction of flow providing an average gas residency time $T_R$ therein wherein $T_R \approx C\,(P/JE)$ where $C$ is approximately $10^{-3}$, providing external ionization of the gas as it flows through the electric discharge region, and applying electrical power to the cathode and anode to scale the optical power density in the electric discharge region to the level $JE$.

15. A method of producing, with or without external ionization, a pulsed mode large volume, stable, diffuse glow electric discharge plasma, and such that plasma properties are dominated by collision processes, at a pressure level $P$ of at least 100 Torr and an electrical power density $JE$ in a gas chamber, comprising the steps of providing in the gas chamber a spaced cathode and anode establishing an electric discharge region therebetween, and applying electrical power to the cathode and anode to scale the optical power density in the electric discharge region to the level $JE$ for an average pulse time $T_P$ where $T_P \approx C\,(P/JE)$ where $C$ is approximately $10^{-4}$ without external ionization of the electric discharge region and $C$ is approximately $10^{-3}$ with external ionization of the electric discharge region.

16. In a convective electric discharge device having an elongated gas convection channel with a longitudinally extending gas passageway for the flow of gas in one direction therethrough and plasma generating means for establishing a gas plasma in an electric discharge region of the gas passageway comprising longitudinally spaced upstream and downstream electrodes in the gas passageway establishing said electric discharge region therebetween, the improvement wherein the plasma generating means comprises a substantially uniform gas pervious foamed plastic cellular baffle extending transversely across substantially the entire gas passageway upstream of the electric discharge region, the cellular baffle having a thickness in the direction of flow sufficient for producing, immediately downstream thereof, a substantially uniform gas velocity profile, and wherein the upstream electrode comprises a plurality of straight, transversely spaced, parallel electrode rods extending longitudinally at least partly through and forwardly of the gas pervious cellular baffle.

17. In a convective electric discharge device having a gas convection channel with a gas passageway for the flow of gas in one direction therethrough and plasma generating means for establishing a gas plasma in an electric discharge region of the gas passageway, the improvement wherein the plasma generating means comprises a gas pervious cellular baffle extending transversely across substantially the entire gas passageway upstream of the electric discharge region for producing, immediately downstream thereof, a substantially uniform gas velocity profile, and turbulence generator means downstream of the cellular baffle and upstream of the electric discharge region and operable to convert said substantially uniform gas velocity profile to an approximately isotropic and uniform turbulent gas flow in the electric discharge region.

18. In a convective electric discharge device having a gas convection channel with a gas passageway for the flow of gas in one direction therethrough and plasma generating means for establishing a gas plasma in an electric discharge region of the gas passageway, the improvement wherein the plasma generating means comprises a gas pervious foamed plastic cellular baffle having an average cell size of between 2–5 mm and extending transversely across substantially the entire gas passageway upstream of the electric discharge region for producing, immediately downstream thereof, a substantially uniform gas velocity profile.

* * * * *

UNITED STATES PATENT AND TRADEMARK OFFICE
CERTIFICATE OF CORRECTION

PATENT NO. : 4,016,448
DATED : April 5, 1977
INVENTOR(S) : Nighan et al

It is certified that error appears in the above-identified patent and that said Letters Patent are hereby corrected as shown below:

Abstract
Line 20, isotopic should be isotropic.

Column 4, line 2, trasverse should be transverse;

Column 5, line 55, slighly should be slightly;

Column 7, line 13, after "where" insert --$T_G$--;

Column 7, line 33, foregong should be foregoing.

Claim 1
Column 8, line 9, extablishing should be establishing;

Claim 12
Column 10, line 8, insert --turbulent-- before "gas flow".

Signed and Sealed this

Fourth Day of October 1977

[SEAL]

Attest:

RUTH C. MASON
Attesting Officer

LUTRELLE F. PARKER
Acting Commissioner of Patents and Trademarks